March 11, 1952    R. R. CLARKE    2,588,486
COMBINED TUCKER AND ORIENTING MECHANISM
FOR SNAP FASTENER ATTACHING MACHINES
Filed Sept. 16, 1949      4 Sheets-Sheet 1
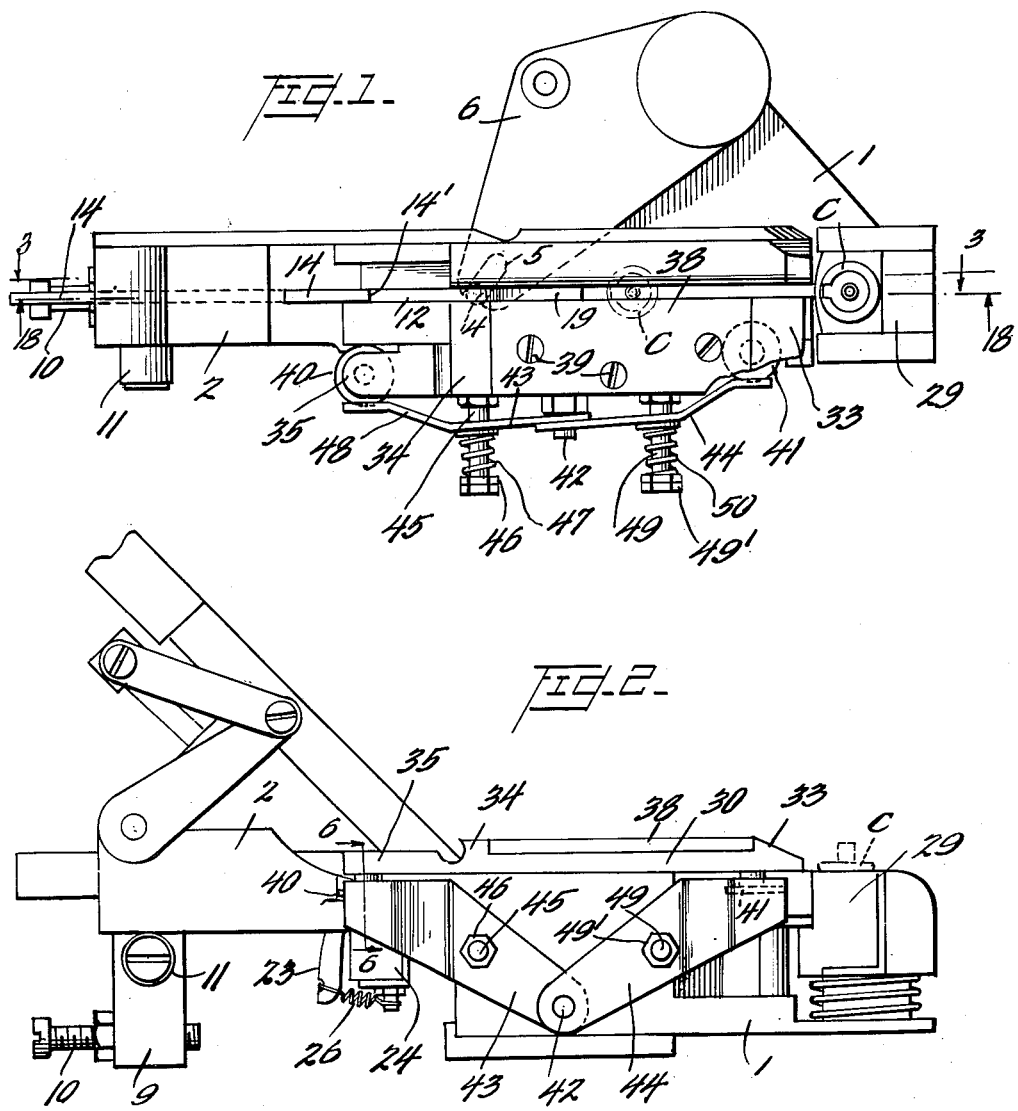
Inventor
Rollin R. Clarke,
By Parker Cook
ATTORNEY

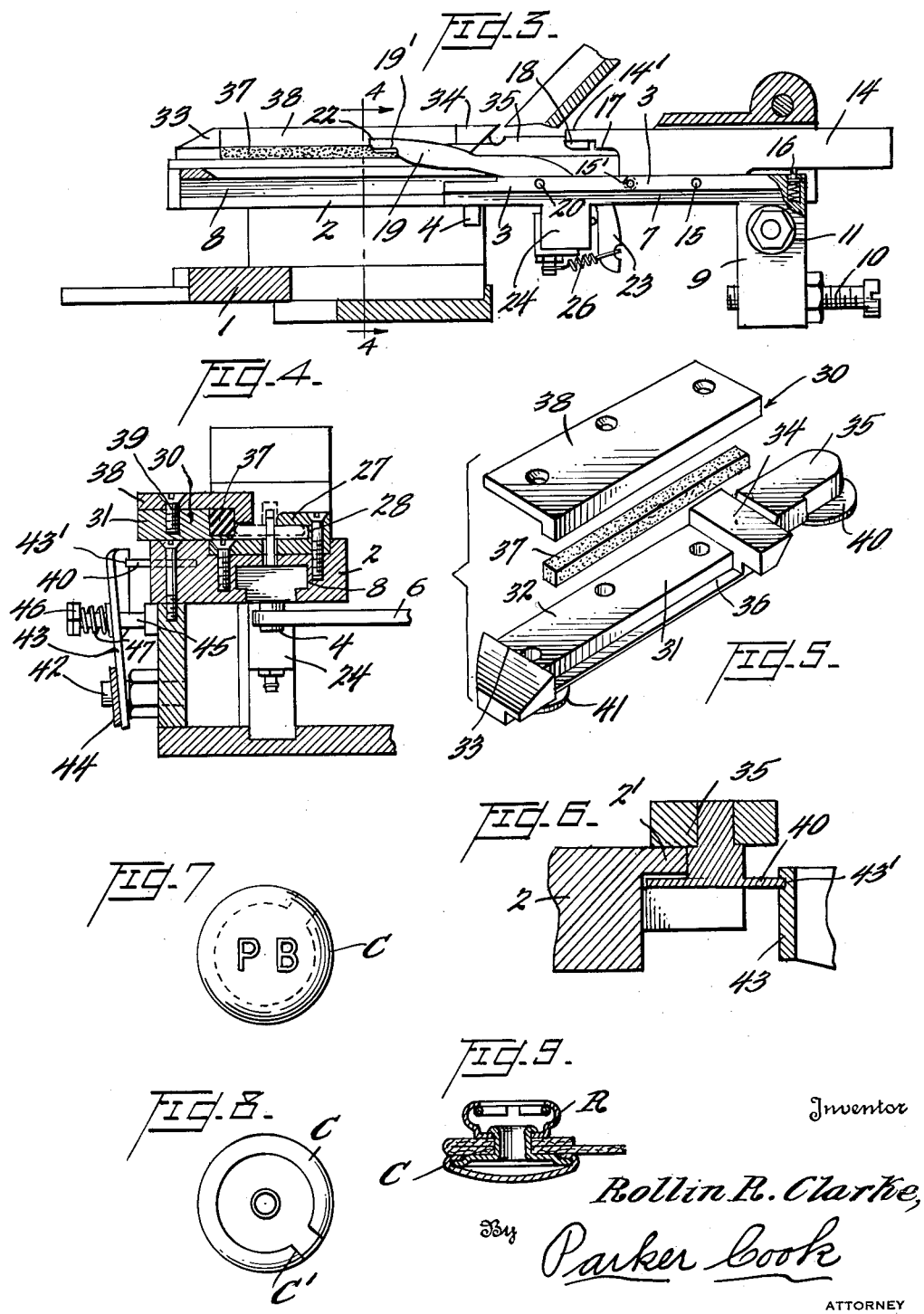

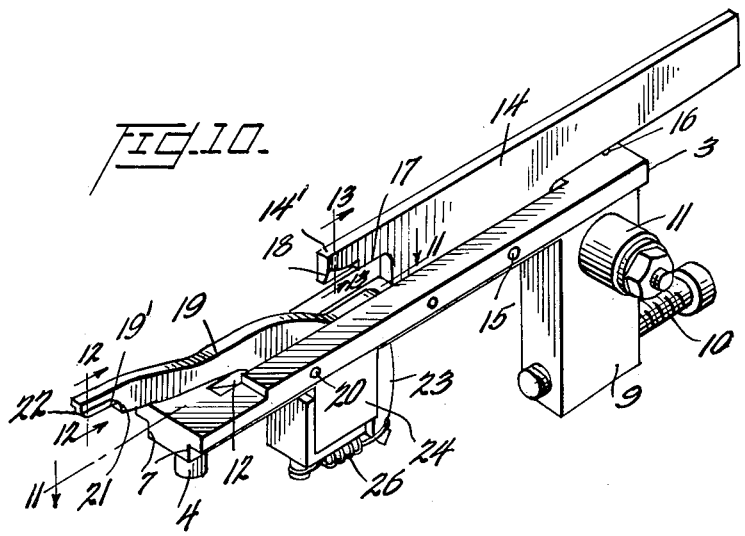
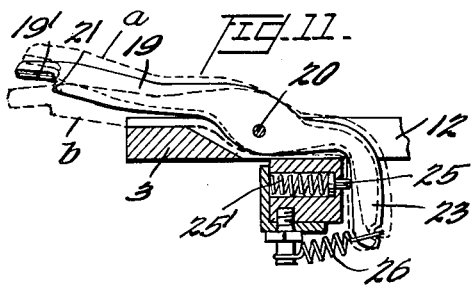
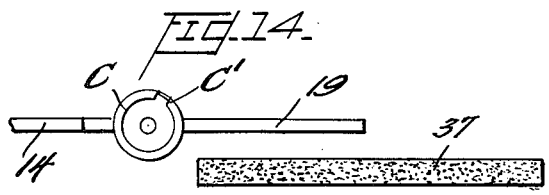
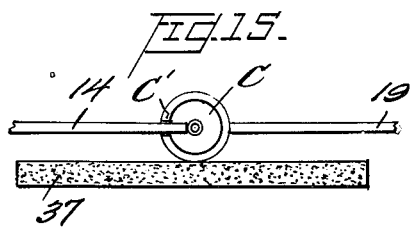
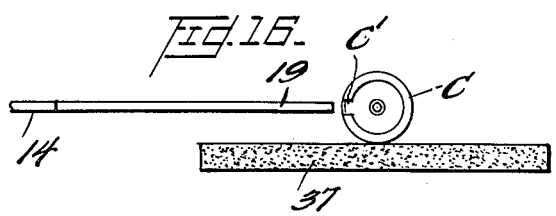
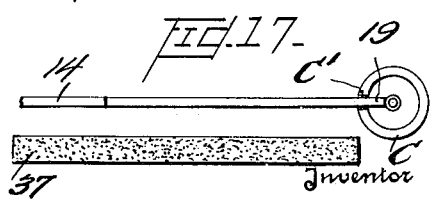

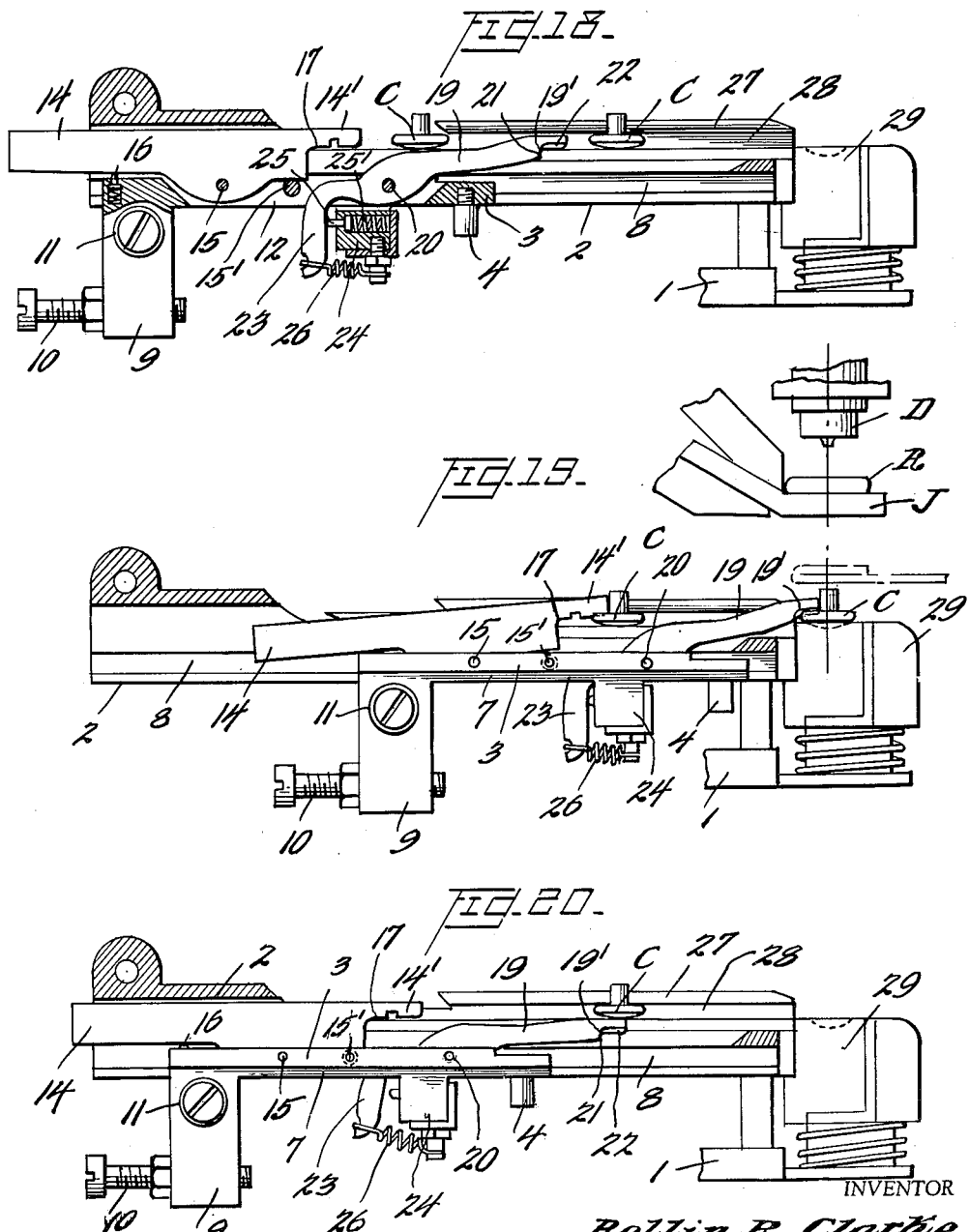

Patented Mar. 11, 1952

2,588,486

UNITED STATES PATENT OFFICE 2,588,486

COMBINED TUCKER AND ORIENTING MECHANISM FOR SNAP FASTENER ATTACHING MACHINES

Rollin R. Clarke, West Cheshire, Conn., assignor to The Patent Button Company, Waterbury, Conn., a corporation of Connecticut Application September 16, 1949, Serial No. 116,015

6 Claims. (Cl. 218—6)

My invention relates to new and useful improvements in a combined tucker mechanism and orienting means for snap fastener attaching machines; and the present invention includes some of the salient features illustrated in the patent granted Peterson December 9, 1941, No. 2,265,574, for a Combined Tucker and Orienting Mechanism for Snap Fastener Attaching Machines, and Patent No. 2,265,575 granted on the same date for a Tucker Mechanism for Button Attaching Machines.

In the first patent mentioned, to wit, 2,265,574, there is shown a tucker slide and a single finger for advancing the snap fastener to the attaching station, the snap fastener being oriented on its way to the attaching station; while in the latter patent, to wit, 2,265,575, there is shown a tucker slide (no orienting mechanism) with two fingers, each of which advances a tack for part of its travel.

The present application combines a two-finger tucker slide plus an orienting mechanism, which latter, however, differs in structure from the orienting mechanism shown in the first patent mentioned.

The type of button or snap fastener attaching machines in which tucker mechanisms are installed are shown in the Patent No. 1,901,375 granted to Peterson on March 14, 1933, for button attaching machines, and the patents to Franklin R. White, No. 1,567,882 issued on December 29, 1925, for Button-Attaching Machines, and No. 1,901,386 issued on March 14, 1933, for Button-Attaching Machines.

In the machines above mentioned, however, there was but little space for the hands of the operator who had to place the goods over the attaching station to attach the button, and swing and turn the goods; but due to the small table space and the close proximity of the tack chute to the plunger, it has been troublesome to turn or swing the goods when desired.

In the Patent No. 2,265,575, there is a larger table, and the double finger tucker mechanism to provide more space, but this in turn is for a tack fastener and not used for orienting purposes.

The present application has the advantage of the larger table and two fingers on the tucker slide so that the snap fastener to be oriented is advanced for half of its travel on the one stroke, and on the next forward stroke is advanced by the forward finger out to the attaching station.

Also, as these snap fasteners are generally embossed on their faces, and it is desirable that the embossing or reading material be in its true horizontal position, the present invention also contemplates the orienting of the snap fastener, either by the rear finger of the tucker while the cap is reaching its intermediate position, or surely by the forward finger of the tucker as the cap travels the last half of its travel to reach the attaching station.

Another object of the invention is to provide an efficient means of causing the snap fastener to be partially revolved during its travel by a frictional unit that is fastened to the side of the tucker base, so that the greatest amount of friction will be on the one side of the cap, and also wherein the amount of lateral pressure to force the cap against the frictional element can be instantly regulated.

Still another object of the invention is to provide a combined tucker and orienting mechanism that is very efficient and will always position the snap fastener cap on the attaching station in its correct oriented position.

With these and other objects in view, the invention consists in certain new and novel arrangements and combination of parts as will be hereinafter more fully described and pointed out in the claims.

Referring now to the drawings, showing a preferred embodiment,

Fig. 1 is a top plan view of my improved tucker slide and orienting mechanism,

Fig. 2 is a side elevation thereof, showing the same and a fragmentary part of the snap fastener feeding chute, Fig. 3 is a vertical sectional view taken on line 3—3 of Fig. 1, looking in the direction of the arrows, Fig. 4 is a sectional view taken on line 4—4 of Fig. 3, looking in the direction of the arrows, Fig. 5 is a dis-assembled perspective of part of the frictional unit for orienting purposes, Fig. 6 is an enlarged sectional view taken on line 6—6 of Fig. 2, Fig. 7 is a top plan view of a snap fastener, showing the embossing, the dotted lines showing the cutout on the under-periphery, Fig. 8 is a bottom plan view of the snap fastener, Fig. 9 is a sectional view of the cap and attached ring member, Fig. 10 is a perspective of the tucker slide and its two fingers, Fig. 11 is a vertical sectional view taken on line 11—11 of Fig. 10, showing the front pivoted finger, and also showing two dotted positions, Fig. 12 is an enlarged sectional view taken on line 12—12 of Fig. 10, showing the formation of the forward part of the forward finger, Fig. 13 is an enlarged sectional view taken on line 13—13 of Fig. 10, showing the formation of the front of the rear finger, Fig. 14 is a diagrammatic view, showing the rear finger and front finger, with a snap fastener cap intermediate the same.

Fig. 15 is a similar view, showing the rear finger as having dropped into the notch in the snap fastener cap, Fig. 16 shows the snap fastener cap about to be engaged by the front finger, Fig. 17 is a similar view, showing the snap fastener cap after it is forced out to the attaching station, Fig. 18 is a vertical sectional view taken on line 18—18 of Fig. 1, showing the two caps about to be advanced, the one having been advanced to its intermediate position, Fig. 19 is a similar view to Fig. 18, but showing the tucker slide in its foremost position, and one of the caps advanced to the attaching station, and Fig. 20 is a similar view, but showing the tucker slide being retracted and the forward finger depressed under the cap that has been advanced to its intermediate station.

At the outset it might be mentioned that only that part of a snap fastener attaching machine is shown which is thought necessary to illustrate the present invention, but the type of machine may be seen in detail, if desired, in the patents heretofore mentioned.

Briefly, a snap fastener attaching machine consists of means for feeding the ring member of the snap fastener to cup-shaped jaws under an attaching plunger and die, together with synchronized means for feeding the cap of the snap fastener from a hopper out to an attaching station directly beneath the plunger, so that on each operation of the machine and descent of the plunger there will always be a cap member on the attaching station, which cap member will have its hub forced into its receptive snap fastener ring member to thus secure the two members together, and, of course, to the fabric that is fed between the two parts of the snap fastener.

In the present instance, the invention first relates to the new and improved tucker mechanism which is somewhat similar in its broadest aspects to the tucker mechanism mentioned in Patent No. 2,265,575 supra, wherein the tucker slide is provided with two fingers, and the chute for the tack is set about four inches to the rear of the attaching station, so that the operator, in holding the cloth, may swing it or turn it beneath the plunger and still have room for his hands to get behind the plunger and avoid their striking the chute holding the attaching member.

Secondly, there is shown in Patent No. 2,265,574, above referred to, a spring-held pivoted gate for causing friction, especially against one side of a snap fastener cap, so that the latter would revolve as it moved out to the attaching station.

The present invention contemplates the combination of the improved tucker mechanism plus a quickly removable unit in which there is held a friction member to press against one side of the cap of the snap fastener, which unit is removably held at its both ends by a certain arrangement of arms and springs, hereafter to be described.

Thus, the amount of pressure for friction on the cap of the snap fastener may be adjusted and set; and furthermore this pressure will be applied substantially equally throughout the length of the unit.

Referring now more particularly to the several views, there is shown in Fig. 1 the improved tucker mechanism with its frictional unit and its associate parts for orienting snap fasteners or the like with relation to the garment to which they are to be attached.

Specifically may be seen what I term the base plate 1, to which is secured the slideway 2, in which is mounted the tucker slide 3 which will be described more in detail as the specification proceeds.

At the forward end of the tucker slide 3 and on its under-surface there is seen a depending pin 4 (see Figs. 3, 4 and 10) which fits within the slot 5 of the substantially triangular-shaped lever 6. It is the operation of this lever 6 from a main crank lever (not shown) of the snap fastener machine that reciprocates this tucker slide 3 as is well known and illustrated in Patents' Nos. 2,265,574 and 2,265,575 supra.

Referring now more specifically to the slide 3 which may probably best be seen in Fig. 10, it will be noticed that the slide 3 on its under sides is undercut as at 7 to provide a T-shaped formation, and this slide 3 in turn reciprocates in the inverted T-slot 8 that extends the length of the slideway 2.

At the rear end of the slide 3 may be seen a downwardly extending lug 9 in which may be seen the stop 10 and the transverse lug 11, that operate an escapement; but these parts per se form no part of the present invention.

The slide 3 is also slotted throughout the greater part of its length as at 12, and mounted in this slot 12 and near the rear of the slide 3 may be seen the rear finger 14 which is pivoted as at 15 and is held in a normal position by the spring-pressed pin 16 mounted in the arm 9, as may clearly be seen in Fig. 3. A stop 15' limits the downward movement of the forward end 14' of the finger 14.

Thus, the forward end 14' of the finger 14 is slightly elevated when passing over a snap fastener cap, as will shortly be mentioned, but will always have a tendency to assume its normal horizontal position due to the spring-pressed pin 16. The forward end 14' of the finger 14 is also undercut as at 17 and the tip is sharpened or made wedge-shaped as at 18, so that it may conveniently find the cutout portion C' in the underneath surface of the snap fastener cap C; and any further clockwise rotation of the cap C will be arrested as the edge of the notch C' will bear against the sharp right angle side of the tucker finger as shown in Fig. 13.

Mounted directly in front of this finger 14 may be seen the front finger 19 which is likewise pivoted as at 20 in the forward end of the slot 12 within the tucker slide 3. The forward end of this finger 19 is also undercut as at 19', leaving the rear wall 21; and the forward end is also reduced as at 22, first, to conveniently fit within the cutout portion C' of the cap C, and, secondly, and what is more important, in most instances the rear finger 14 will have registered with the notch C' in the cap C by the time the cap C has been advanced to its intermediate point, that is, to the position before it is to be taken over by the front finger 19. Then, on the succeeding forward movement of the tucker slide 3, and as the finger 19 rides up the rim and snaps into the notch C', the cap C may be pushed forward slightly and therefore may rotate further very slightly in a clockwise direction; but, by having the offset or reduced portion 22 in the forward end of the finger 19, this slight rotation will be allowed for and the finger 19 will always snap into the notch C' to prevent further rotation of the cap C.

The rear end of this finger 19 is bent downwardly to form the integral arm 23, as may be seen in Fig. 11, it extending downwardly through the slot 12 and behind a small housing 24 and in close proximity thereto. In this housing 24 may be seen in the spring-pressed pin 25 and its spring 25' that normally bear against this arm 23.

To the bottom of the arm 23 there is attached the spring 26 which is weaker than the spring 25' that bears against the pin 25 but holds the arm 23 against the pin 25 and thus holds the finger 19 in its normal position. Thus, when the front finger 19 rides over the snap fastener cap C with its cutout C', there will be considerable downward pressure of the finger 19 on the cap C as it has to force the pin 25 inwardly and compress the spring 25'.

After the cap C is forced out on the anvil 29 by the forward finger 19 and the forward finger 19 is retracted, the spring-pressed pin 25 pressing on the arm 23 of the finger 19 will cause the finger 19 to assume its normal position. Then, as the tucker slide 3 continues in its rearward movement, the finger 19 will cam or be depressed under the cap C; and as soon as it is withdrawn from underneath the same, the spring 26 will pull the arm 23 inwardly against this pin 25 and the finger 19 will again assume its normal position.

Referring now, for the moment, to the slideway 2 and referring to Fig. 4, there will be seen mounted on the top of the same and on the right hand side in Fig. 4 part of a guideway 27 to form the slot 28 therein, which is of sufficient height and width to permit the cap C to slide along and rotate in this slot 28 on its travel out to an attaching station 29, as may be seen in Fig. 2. This slot 28, of course, is adjacent the fingers 14 and 19 of the tucker slide 3.

Still referring to Fig. 4, it will be seen that on the opposite side of the slideway 2 to complete the guideway 27 for the cap C is a frictional unit 30 that is to be held under spring pressure so that as the cap C is forced forward by the fingers 14 and 19, one side of the cap C will bear against the rubber insert 37 of the frictional unit 30, while the other side will not touch the adjacent side wall.

Referring now more specifically to the frictional unit 30, and for the moment to Fig. 5, showing a dis-assembled view of the same, there will be seen the what might be termed body 31 which is reduced along its face as at 32, leaving the slightly upstanding end 33, the raised portion 34, and the outwardly extending stub arm 35. It will also be noticed that the body 31 is cut back slightly at 36 throughout its length to form a shelf for the rubber frictional insert 37 which is then held in place by the cover 38 that is to be fastened by screws 39 over the reduced portion 32 of the body 31.

By having the fractional insert 37 square in cross-section, when it wears the cover 38 may be removed and the frictional insert 37 rotated or turned to expose a new wearing surface.

On the under-surface of the unit 30 and at its opposite ends may be seen the two enlarged headed integral posts 40 and 41, which are circular in plan, and the heads spaced slightly from the bottom of the unit 30; and the heads in turn fit under the lugs 2' formed on the side of the slideway 2, so there can be no appreciable upward movement of the unit 30. (See Fig. 6). This unit 30 is supported on the slideway 2, and when the posts 40 and 41 are in place, the width of the slot or track 28 for the cap C formed by the guideway 27 on one side and this unit 30 on the other side is less than the diameter of the cap C, so that there will be a relatively great amount of pressure between the cap C on its one side and the rubber insert 37 in the frictional unit 30.

Now, to hold this frictional unit 30 under spring pressure, there is shown a central post 42 which is also secured in the side of the tucker base plate 1, which post 42 is located about centrally of the length of the said frictional unit 30.

Referring now to Figs. 1 and 2, there may be seen the two like arms 43 and 44 that have their interjacent ends secured over this post 42. Referring for the moment to the arm 43, it will be seen that about centrally of its length there is an opening through which is passed a bolt 45; and between the arm 43 and the adjusting nuts 46 may be seen the spring 47. The arm 43 is then offset as at 48 to bear against the head of the post 40 on the stub arm 35 on one end of the unit 30.

The arm 44 is similar to the one just described 43 and bears against the post head 41 on the opposite end of the unit 30. Both arms 43 and 44 have small grooves 43' on their under-surfaces to snap over the respective post heads 40 and 41.

Through the last-mentioned arm 44, there is likewise a stud 49 with its spring 50, and by turning the nuts 46 and 49' the compression of the springs 47 and 50 can be varied, so that the pressure on the arms 43 and 44 and in turn on the posts 40 and 41 may be regulated. Thus, the unit 30 is held under heavy spring compression, which is necessary to cause the caps C to revolve as they are advanced by the tucker slide 3. It will also be seen that by having the arms 43 and 44 bear on each end of the unit 30, the compression on the unit 30 is substantially the same throughout its length.

It will be seen that when it is necessary to remove the unit 30, due possibly to a cap C being jammed in the track 28, or in case the trackway might become slightly clogged from lint from the goods, or from oil or grease, or it is necessary to put in a new rubber frictional unit 37, the operator need only pull the two spring arms 43 and 44 outwardly so that the post heads 40 and 41 may become disengaged from the grooves 43' in the respective arms 43 and 44, and then the arms 43 and 44 pushed slightly downwardly, and the unit 30 also pulled towards the operator, so that the posts 40 and 41 will slip from beneath the lugs 2'. Of course, to replace the unit 30, the operation is just reversed.

Also, by having the spring arms 43 and 44 arranged as shown, together with their springs 49 and 50, which are adjustable, the pressure by the rubber frictional unit 37 may be quickly and readily adjusted, and is equalized throughout the length of the whole unit 30.

Referring now to Figs. 14 to 17 inclusive, I have shown diagrammatically a cap C as having dropped in front of the rear finger 14. Fig. 15 shows the cap C as pressed against the frictional element 37 and being rotated in its advancement until the tip 18 of the finger 14 has snapped within the cutout portion C' in the underneath of the cap C.

Fig. 16 shows the cap C at what might be called its intermediate point of travel, and the forward end 19' of the finger 19 about to engage the slot C' of the cap C. The cap C will, of course, not be rotated now as it will be held against rotation by the tip 19' of the finger 19 fitting within the slot C'.

In Fig. 17 I have shown the oriented cap C about to be deposited on the anvil 29.

It will be understood that if for any reason the rear finger 14 has not engaged the slot C' of the cap C on the advancement of the cap C to its intermediate point, the forward finger 19 will be sure to engage the slot C' so that the cap C will positively be oriented by the time it reaches the anvil 29.

Having described the several parts and their functions, a brief recapitulation of the operation of the tucker slide will be set out.

Referring, therefore, to Figs. 18, 19 and 20, and for the moment to Fig. 18, and assuming for the purpose of illustration and description that the forward cap C is in the position shown, and the rear cap C has just been deposited from a chute on the slideway 2 and in front of the finger 14, and in line with the slot 28 and just behind the entrance to the frictional unit 30, a forward movement of the tucker slide 3, by a movement of the triangular lever 6 will advance the tucker slide 3, and the forward end of the rear finger 14 will ride up over the underrim of the cap C, depressing the spring 16, so that there will be a downward pressure on the forward end 14' of the said finger 14.

Also, the forward finger 19 will ride up over the rim of the forward cap C until the tip 19' of the finger 19 contacts with the hub of the cap C; and the rear cap C pressing against the rubber frictional unit 37 will be rotated until the forward end 14' engages the slot C' in its cap C.

In all probability, the cutout portion C' of the forward cap C will be in proper alignment to receive the forward end 19' of the finger 19, and when this finger 19 rides up over the cap C, as shown in dotted position *a* in Fig. 11, it will depress the spring-pressed pin 25, thus exerting a sufficient downward pressure on the cap C to hold the finger 19 within the slot C.

In Fig. 19, there is shown the cap C as now having been deposited in a proper oriented manner on the anvil 29, and in this view I have also fragmentarily shown the jaws J of the attaching machine holding the ring member R. Also the die D is shown above the ring member R and about to be attached to its cap C.

As the ring member R and its cap C are fastened by the descent of the die D, the tucker slide 3 is retracted.

In Fig. 20, I have now shown the finger 19 as being depressed beneath the cap *c* which has now been advanced to the intermediate point in its travel. When the finger 19 is depressed, as shown in dotted position *b* in Fig. 11, it stretches the spring 26, as may be seen in Fig. 20, so that as soon as it is withdrawn from beneath the cap C in its rearward movement, it will again spring to the position as shown in Fig. 18. Of course, on a further retraction from the position shown in Fig. 20, the rear finger 14 will again be in a position to ride up on a new cap C that will be deposited in front of it.

It will, of course, be understood that both caps, or either cap, will be rotated by a forward movement of the tucker slide 3, in most instances by the rear finger 14 until this finger snaps in the slot C'; and if the cap C has not fully rotated to receive the rear finger 14, it surely will have rotated to receive the end of the forward finger 19 before reaching the attaching station 29.

Of course, the cap C never rotates after either of the fingers 14, 19 is engaged in the slot C', and if it so happens that when one of the caps C falls in front of the rear finger 14, the cutout portion C' is nearly in alignment with the finger 14, then the cap C would only be rotated in a very small part of its travel.

In any event, the cap C is always in its desired oriented position with its reading matter in a horizontal direction by the time it reaches the attaching station 29.

Finally, it will be understood that although it is not shown in the drawings, when the cap C reaches its final position on the attaching station 29, it will be held against retraction by the jaws (not shown) located on the anvil 29.

From the foregoing, it will be seen that I have provided a tucker mechanism and an orienting mechanism wherein the frictional unit may easily be attached and quickly detached, and wherein the pressure on one side of the cap may be instantly regulated and set.

Also, I have provided a very accurate tucker slide with its two fingers so that in the one movement of the slide, the caps may be advanced in two stages, thus cutting down the length of travel of the tucker slide, and the caps will always be in their proper oriented position when reaching the attaching station.

As heretofore mentioned, only that much of the attaching machine of which the tucker slide is a part is shown that it is thought necessary to understand the present invention.

Having thus described the same, what I claim is new and desire to secure by Letters Patent is:

1. In a machine for attaching snap fasteners, which latter have embossing on their outer faces and notched under-surfaces in a certain definite relation to the embossing, a reciprocating tucker mechanism, including a tucker slide having a rear spring-pressed pivotal finger for overlying the snap fastener and a forward spring-pressed pivotal finger for also overlying the snap fastener, the rear finger adapted to advance each snap fastener for a part of its travel, and the forward finger adapted to advance the snap fastener to an attaching station of the machine; means for operating the tucker mechanism, frictional means for engaging the rim only of the snap fastener for causing the rotation of the snap fastener in its travel, and both of said fingers being adapted to snap into the said notched surface in said snap fastener when respectively in registry therewith, to thereby arrest the rotation of the snap fastener and hold it in its oriented position during the remainder of its travel to the attaching station.

2. In a machine for attaching snap fasteners, which latter have embossing on their outer faces and notched under-surfaces in a certain definite relation to the embossing, a reciprocating tucker mechanism, including a tucker slide having a rear spring-pressed pivotal finger for overlying the snap fastener and a forward spring-pressed pivotal finger for also overlying the snap fastener, the rear finger adapted to advance each snap fastener for a part of its travel and the forward finger adapted to advance the snap fastener to an attaching station of the machine; means for operating the tucker mechanism, frictional means for engaging the rim only of the snap fastener for causing the rotation of the snap fastener in its travel, the rear finger due to the spring pressure being adapted to snap into the said broken surface in said snap fastener if the said finger and the notched surface are in alignment by the time the snap fastener has reached the end of its travel, caused by the movement of the rear finger; and if not, the forward finger adapted to snap into the notched surface of the snap fastener due to the spring pressure and stop its rotation to thus orient the same before the snap fastener reaches the attaching station.

3. In a machine for attaching snap fasteners, which latter have embossing on their outer faces and notched under-surfaces in a certain definite relation to the embossing, a reciprocating tucker mechanism, including a tucker slide having a rear spring-pressed pivotal finger and a forward spring-pressed pivotal finger each for overlying the snap fastener, the rear finger adapted to advance each snap fastener for a part of its travel, and the forward finger adapted to advance the snap fastener to an attaching station of the machine; means for operating the tucker mechanism, frictional means for engaging the rim only of the snap fastener, for causing the rotation of the snap fastener in its travel, the rear finger due to the spring pressure generally snapping into the said broken surface in the snap fastener during the latter's movement caused by the rear finger, and the forward finger always due to the spring pressure snapping into the broken surface of the snap fastener either during the initial contact of the forward finger with the snap fastener, or during the travel of the snap fastener to the attaching station, to thus orient the snap fastener before the same reaches the attaching station.

4. In a machine for attaching snap fasteners, which latter have embossing on their outer faces and notched under-surfaces in a certain definite relation to the embossing, a tucker mechanism including a tucker slideway, a reciprocating tucker slide mounted therein, said tucker slide having a rear spring-pressed pivotal finger and a forward spring-pressed pivotal finger, both for overlying the snap fastener, the rear finger adapted to advance each snap fastener for a part of its travel and the forward finger adapted to advance the snap fastener for the remainder of its travel to the attaching station of the machine; means for reciprocating the tucker slide, frictional means including two springs for equalizing the pressure throughout the length of the frictional means and said frictional means clamped to the tucker slideway, said frictional means engaging the rim only of the snap fastener for causing the rotation of the snap fastener during its travel, means for regulating the amount of pressure of the frictional means against the snap fastener, both of said fingers due to the spring pressure adapted to snap into said notched surface in the snap fastener when respectively in registry therewith, to thereby arrest the rotation of the snap fastener during the remainder of its travel to the attaching station.

5. In a machine for attaching snap fasteners, which latter have embossing on their outer faces and notched under-surfaces in a certain definite relation to the embossing, a tucker mechanism including a tucker slideway, a reciprocating tucker slide mounted therein, said tucker slide having a rear spring-pressed pivotal finger and a forward spring-pressed pivotal finger both of said fingers adapted to overlie the snap fastener, the rear finger adapted to advance each snap fastener for a part of its travel and the forward finger adapted to advance the snap fastener for the remainder of its travel to an attaching station of the machine, means for reciprocating the tucker slide, a frictional unit removably mounted on the tucker slideway, spring-pressed arms secured at their inner ends to said slideway about centrally thereof and bearing against said frictional unit at its outer ends to thereby equalize the pressure throughout the length of the frictional unit, means for regulating the pressure of said spring-pressed arms against said unit, frictional means within the frictional unit engaging the rim only of the snap fastener for causing the rotation of the snap fastener during its travel; both of said fingers adapted to snap into said notched surface of the snap fastener when respectively in registry therewith due to the spring pressure to thereby arrest the rotation of the snap fastener and hold the same in its oriented position until it reaches the attaching station.

6. In a snap fastener attaching machine, a tucker mechanism, means for operating the same, said tucker mechanism including a tucker slide, two spring-pressed pivotal fingers mounted on said slide and adapted to successively contact with and overlie the notched hub of a snap fastener cap for advancing the same, a frictional unit associated with the tucker mechanism for contacting with the outer periphery of the snap fastener cap and adapted to cause rotation of the cap during its outward travel, until one of said spring-pressed fingers snaps into the notch and arrests the rotation of the cap in a certain predetermined position during its outward travel, and means for adjusting and equalizing the amount of friction against the said snap fastener cap during the length of its travel.

ROLLIN R. CLARKE.

REFERENCES CITED

The following references are of record in the file of this patent:

UNITED STATES PATENTS

| Number | Name | Date |
|---|---|---|
| 937,150 | Havener | Oct. 19, 1909 |
| 1,524,139 | Klagges | Jan. 27, 1925 |
| 2,136,536 | Bares | Nov. 15, 1938 |
| 2,265,574 | Peterson | Dec. 9, 1941 |
| 2,265,575 | Peterson | Dec. 9, 1941 |